United States Patent
Lucas et al.

(10) Patent No.: US 9,657,732 B2
(45) Date of Patent: May 23, 2017

(54) MODULAR DISCHARGE SILENCER FOR VEHICLE-MOUNTED COMPRESSOR

(75) Inventors: Michael J. Lucas, Mooresville, NC (US); Walter Mürmann, Oberhausen (DE)

(73) Assignee: Ingersoll-Rand Company, Davidson, NC (US)

( * ) Notice: Subject to any disclaimer, the term of this patent is extended or adjusted under 35 U.S.C. 154(b) by 669 days.

(21) Appl. No.: 13/825,748

(22) PCT Filed: Sep. 23, 2010

(86) PCT No.: PCT/US2010/050040
§ 371 (c)(1),
(2), (4) Date: Jul. 12, 2013

(87) PCT Pub. No.: WO2012/039715
PCT Pub. Date: Mar. 29, 2012

(65) Prior Publication Data
US 2013/0280109 A1    Oct. 24, 2013

(51) Int. Cl.
*F04B 53/00*    (2006.01)
*F04D 29/66*    (2006.01)
(Continued)

(52) U.S. Cl.
CPC .............. *F04B 53/001* (2013.01); *F01N 1/00* (2013.01); *F01N 13/00* (2013.01);
(Continued)

(58) Field of Classification Search
CPC  F04B 39/0061; F04B 39/0066; F04B 53/001; F04B 39/0027; F04B 39/0033;
(Continued)

(56) References Cited

U.S. PATENT DOCUMENTS 3,016,972 A * 1/1962 Dugas ..................... F01N 1/083
181/268
3,470,979 A * 10/1969 Everett ............. F16L 55/02709
181/268
(Continued)

FOREIGN PATENT DOCUMENTS

CN    1995752 A    7/2007
CN    101564973 A    10/2009
(Continued)

OTHER PUBLICATIONS

International Search Report for Application No. PCT/US2010/050040 dated Jun. 28, 2011 (3 pages).
(Continued)

*Primary Examiner* — Dominick L Plakkoottam
(74) *Attorney, Agent, or Firm* — Taft, Stettinius & Hollister LLP

(57) ABSTRACT

A modular silencer for use on a compressor or blower mounted on a vehicle. The compressor has an intake port and an exhaust port, and the silencer has an inlet port in communication with the exhaust port of the compressor. The silencer includes a silencer housing and a resonator assembly removably positioned inside the housing. In one embodiment, the compressor includes a compressor housing and a power input shaft protruding from the compressor housing adjacent the air exhaust port. The silencer housing preferably includes a concave portion that at least partially receives the power input shaft. The silencer housing can also include a groove on the inner surface, and the resonator assembly can be at least partially positioned in the groove. Preferably, the resonator assembly includes a resonator plate, a plurality of resonator pipes extending through the plate, and a reinforcing flange coupled between at least two of the resonator pipes.

12 Claims, 12 Drawing Sheets

(51) Int. Cl.

| | | |
|---|---|---|
| *F04B 39/00* | (2006.01) | |
| *F04C 29/06* | (2006.01) | |
| *F01N 13/00* | (2010.01) | |
| *F01N 1/00* | (2006.01) | |
| *B60P 1/60* | (2006.01) | |
| *F01N 1/02* | (2006.01) | |
| *F01N 1/08* | (2006.01) | |

(52) U.S. Cl.
CPC ...... *F04B 39/0027* (2013.01); *F04B 39/0055* (2013.01); *F04B 39/0061* (2013.01); *F04B 39/0066* (2013.01); *F04C 29/061* (2013.01); *F04D 29/663* (2013.01); *F04D 29/665* (2013.01); *B60P 1/60* (2013.01); *F01N 1/02* (2013.01); *F01N 1/089* (2013.01); *F01N 2340/04* (2013.01); *F01N 2450/24* (2013.01); *F01N 2450/30* (2013.01); *F01N 2490/155* (2013.01); *F01N 2590/08* (2013.01)

(58) Field of Classification Search
CPC .. F04B 39/0038; F04B 39/0055; F04C 29/06; F04C 29/061; F04C 29/066; F04C 29/068; F04D 29/665; F01N 1/02; F01N 13/00; F01N 1/00
USPC .................................. 417/312; 181/212, 241
See application file for complete search history.

(56) References Cited

U.S. PATENT DOCUMENTS

| | | | |
|---|---|---|---|
| 5,208,429 A | 5/1993 | Field | |
| 5,801,344 A | 9/1998 | Herold | |
| 6,009,705 A * | 1/2000 | Arnott ........................ | F01N 1/02 123/184.57 |
| 8,016,071 B1 * | 9/2011 | Martinus ............. | F04B 39/0061 181/268 |
| 2002/0048521 A1 * | 4/2002 | Achtelik ................. | F01C 21/02 418/47 |
| 2002/0048523 A1 * | 4/2002 | Achtelik ................. | F04C 23/00 418/104 |
| 2003/0150669 A1 * | 8/2003 | Craig ........................ | F01N 1/02 181/231 |
| 2004/0050618 A1 * | 3/2004 | Marocco ................... | F01N 1/02 181/248 |
| 2004/0234387 A1 * | 11/2004 | Marshall ............. | F04B 39/0061 417/312 |
| 2006/0065478 A1 * | 3/2006 | Rockwell ................ | F01C 21/10 181/250 |
| 2006/0086563 A1 * | 4/2006 | Lucas ...................... | F01N 1/02 181/230 |
| 2006/0124385 A1 * | 6/2006 | Lucas ............... | F16L 55/02727 181/258 |
| 2006/0272888 A1 | 12/2006 | Lucas et al. | |
| 2006/0286013 A1 | 12/2006 | Hovda et al. | |
| 2008/0170914 A1 * | 7/2008 | Rutherford ............ | B60K 17/28 406/42 |
| 2009/0261543 A1 | 10/2009 | Bodet et al. | |
| 2010/0080677 A1 * | 4/2010 | Heinzen ................. | B65G 53/24 414/298 |

FOREIGN PATENT DOCUMENTS

| | | |
|---|---|---|
| DE | 726028 C | 10/1942 |
| DE | 9413878 U1 | 11/1994 |
| DE | 20213195 U1 | 12/2002 |
| DE | 202010006885 U1 | 8/2010 |
| EP | 1564060 A1 | 8/2005 |
| KR | 1019970075236 A | 12/1997 |

OTHER PUBLICATIONS

Chinese Patent Office, Office Action issued in corresponding Application No. 201080070296.4, dated Dec. 9, 2015, 15 pp.
European Patent Office, Extended Search Report issued in corresponding Application No. 10857612.5, dated Jan. 13, 2016, 10 pp.

* cited by examiner

MODULAR DISCHARGE SILENCER FOR VEHICLE-MOUNTED COMPRESSOR

FIELD OF THE INVENTION

The present invention relates generally to mobile vehicles, such as trucks and trailers, road transport vehicles, rail transport vehicles, and the like that transport bulk goods and, more specifically, to discharge silencers used on compressors mounted on such vehicles.

BACKGROUND OF THE INVENTION

Vehicle-mounted air compressors are used to unload dry and liquid bulk goods from large pressurized vessels and container trucks and trailers. The technique involves pumping compressed air into the top end of a vessel/container while opening a valve in a lower end of the vessel/container to allow the dry or liquid goods to be conveyed out of the mobile vessel/container and into a different storage unit. Examples of dry products conveyed out of vehicles using this technique include flour, wheat, cereal, cornstarch, synthetic powder, granulated products, cement, limestone, and fly ash. Examples of liquid products conveyed out of vehicles using this technique include chemicals, solvents, food, liquid sugar, molasses, and bitumen.

When a compressor is mounted on a vehicle, the compressor is commonly driven off of the engine that drives the vehicle. As a result, the speed of the compressor is typically proportional to the speed at which the vehicle's engine drives a compressor. The vehicle engine speed can vary depending on the size and type of engine, and on the vehicle and environment in which the compressor is used.

Noise from the compressor is a concern to vehicle operators because of the existing health and safety regulations, and especially in situations where the vehicles are used to unload dry and liquid goods in densely-populated areas. Specifically, pressure pulsations generated at the discharge and/or suction port of a compressor is a major contributor to the total noise of the compressor. Pressure pulsations propagate through the entire piping system and radiate through the walls of the pipes. Silencers are commonly used to reduce the severity of these pressure pulsations.

SUMMARY OF THE INVENTION

The present invention provides a modular silencer for use on a compressor (e.g., a screw compressor) mounted on a vehicle (e.g., a tractor, truck, or trailer). The compressor has an intake port and an exhaust port, and the silencer has an inlet port in communication with the exhaust port of the compressor. The silencer includes a housing and a resonator assembly removably positioned inside the housing. The housing includes a removable portion (e.g., a side cover) that facilitates access to and removal of the resonator assembly.

In one embodiment, the compressor includes a compressor housing and a power input shaft protruding from the compressor housing adjacent the air exhaust port. In this embodiment, the silencer housing preferably includes a concave portion that at least partially receives the power input shaft.

The silencer housing can also include a groove on the inner surface, and the resonator assembly can be at least partially positioned in the groove. Preferably, the resonator assembly includes a resonator plate and a plurality of resonator pipes extending through the plate. In this embodiment, the resonator plate is slidably positioned in the groove. If desired, a reinforcing flange can be coupled between at least two of the resonator pipes.

Other aspects of the invention will become apparent by consideration of the detailed description and accompanying drawings.

DETAILED DESCRIPTION

Figure 1:
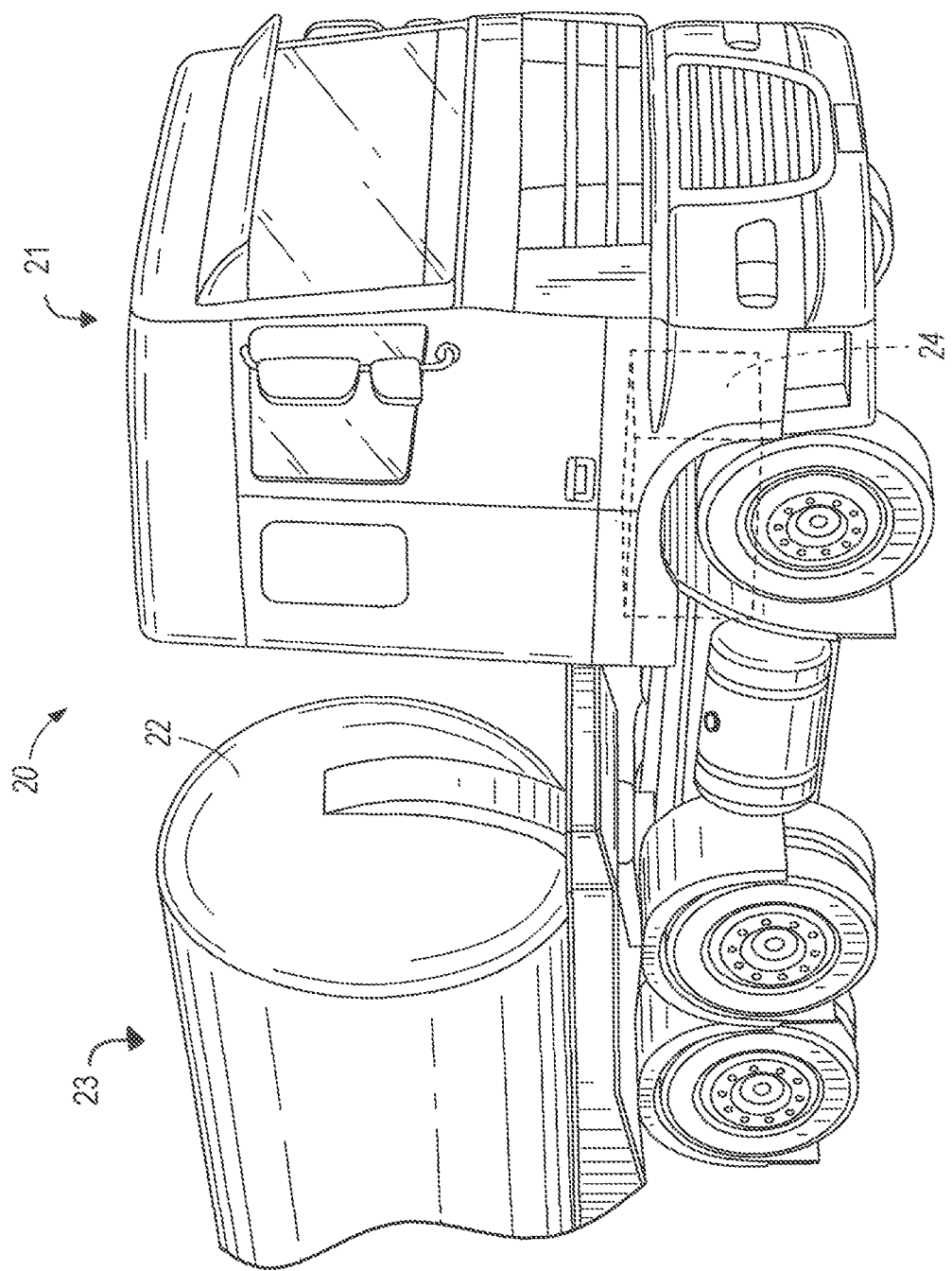
FIG. 1 illustrates a tractor-trailer having a compressor shown schematically.
Figure 2:
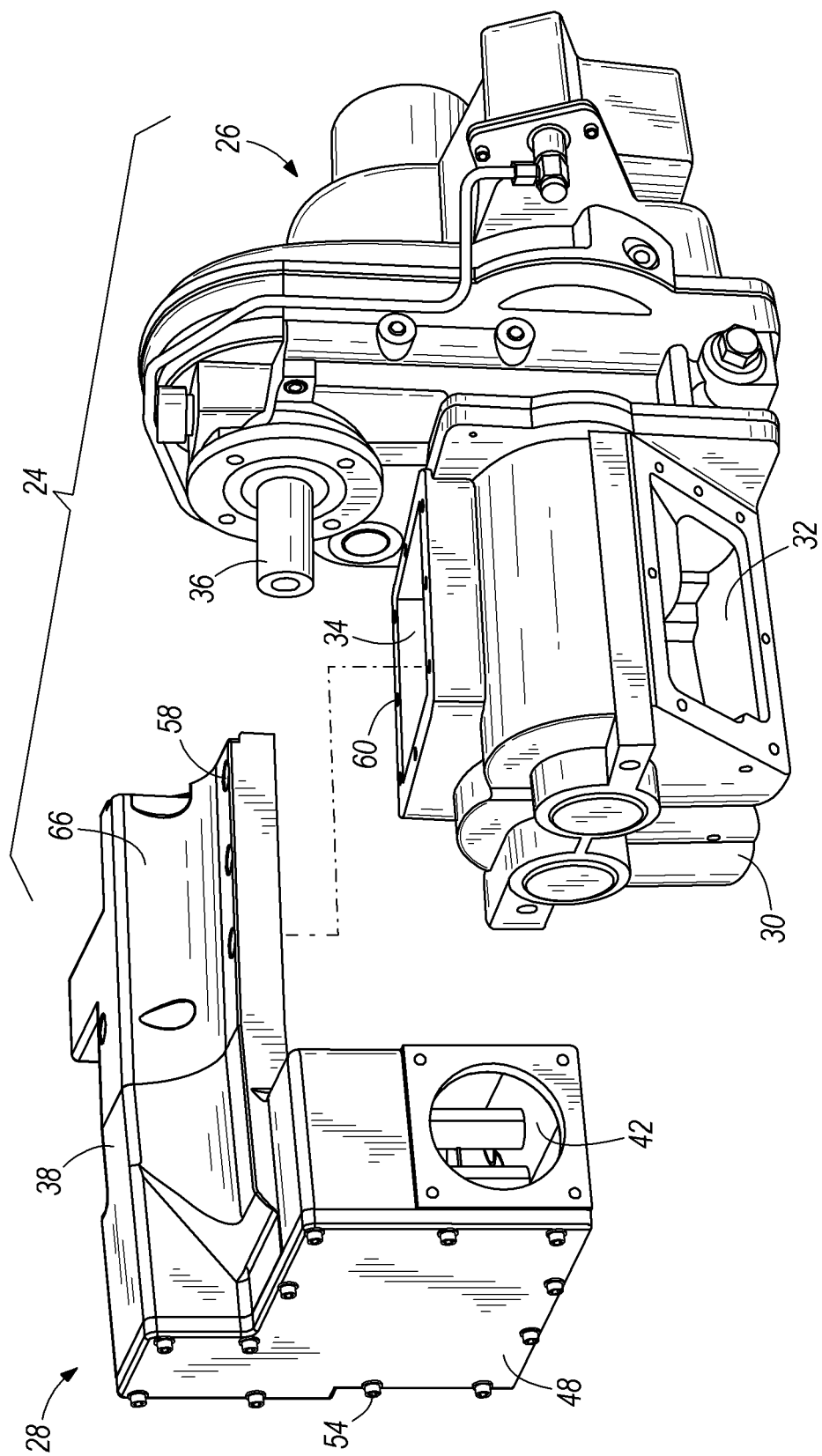
FIG. 2 is an exploded view of a vehicle-mounted compressor assembly having a compressor and a discharge silencer.
Figure 3:
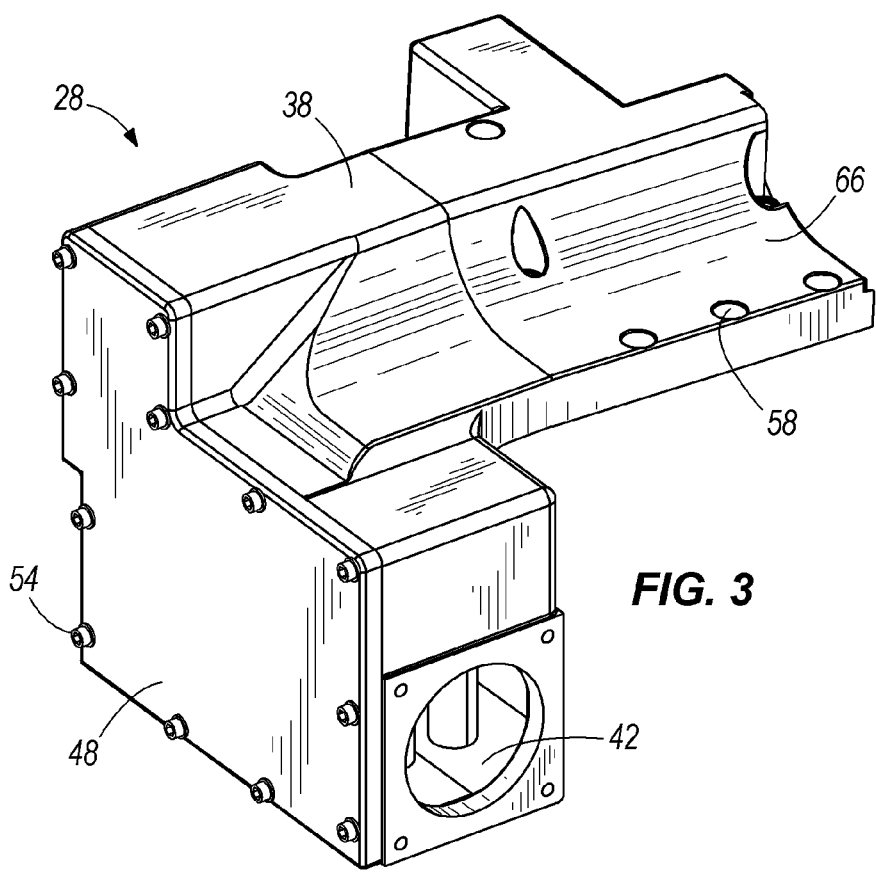
FIG. 3 is an upper perspective view of the discharge silencer of FIG. 2.

FIG. 1 illustrates a vehicle in the form of a tractor-trailer 20 (showing tractor 21 and trailer 23) having a storage container 22 for holding bulk goods and a compressor assembly 24 for providing pressurized air to the container. It should be noted that while the invention is shown and described in association with the tractor-trailer 20, other vehicles (e.g., railroad cars) could also be employed with the invention. Referring to FIG. 2, the compressor assembly 24 includes a compressor 26 and a silencer 28. The compressor 26 includes a compressor housing 30 defining an air intake port 32 and an air exhaust port 34. A power input shaft 36 extends out of the compressor housing 30 to provide a means for driving the compressor 26 (e.g., by an external source, such as an auxiliary drive from the tractor). The illustrated compressor 26 is a CS1200 oil-free screw compressor, available from G.H.H. Rand GmbH of Oberhausen, Germany. Of course other constructions could employ other types of compressors (e.g., rotary, piston, fan, sliding vane, etc.) or blowers (e.g., rotary axial blower, etc.) in place of or in conjunction with the illustrated compressor.

Figure 7:
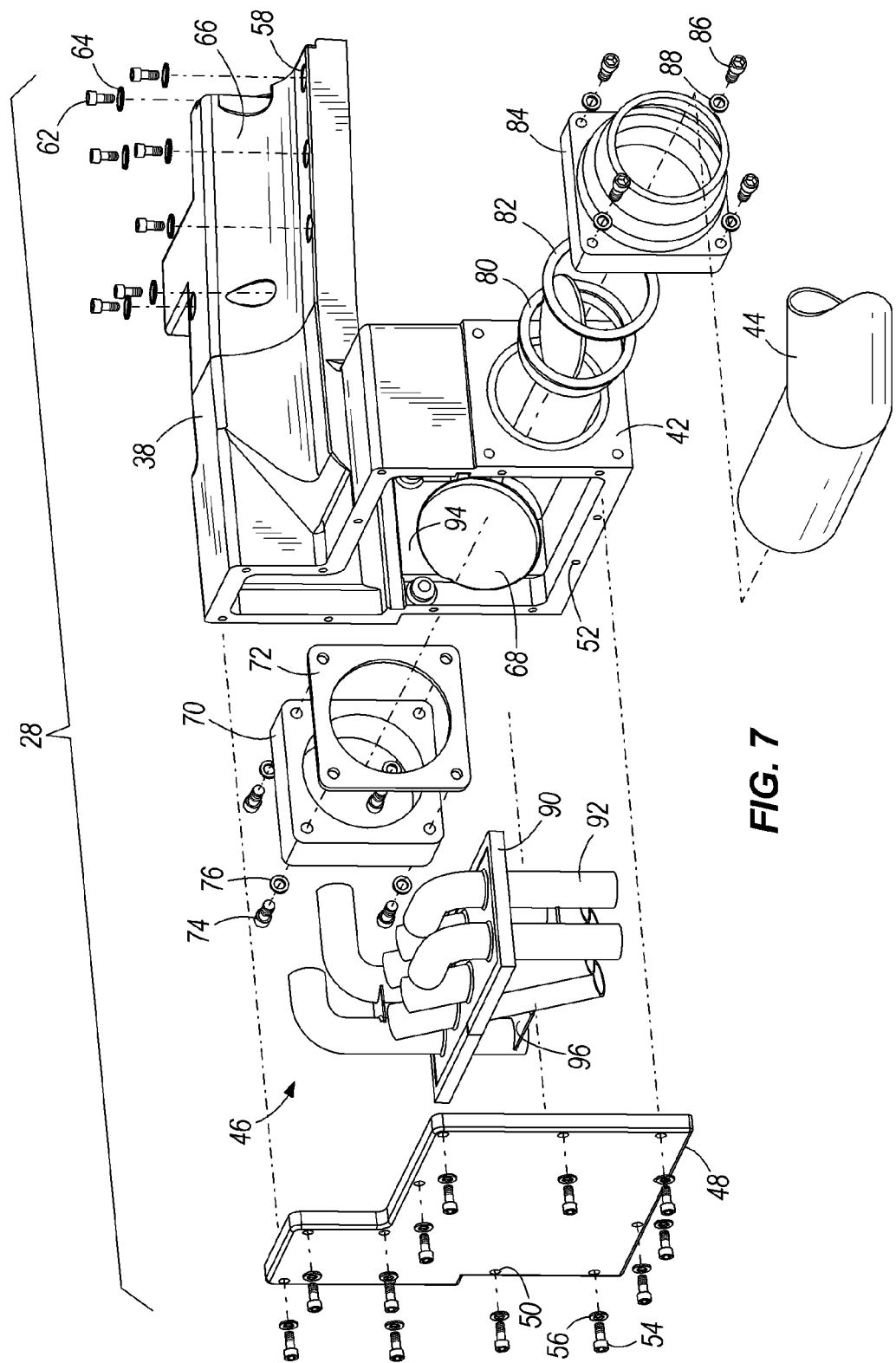
FIG. 7 is an exploded perspective view of the discharge silencer of FIG. 2.
Figure 8:
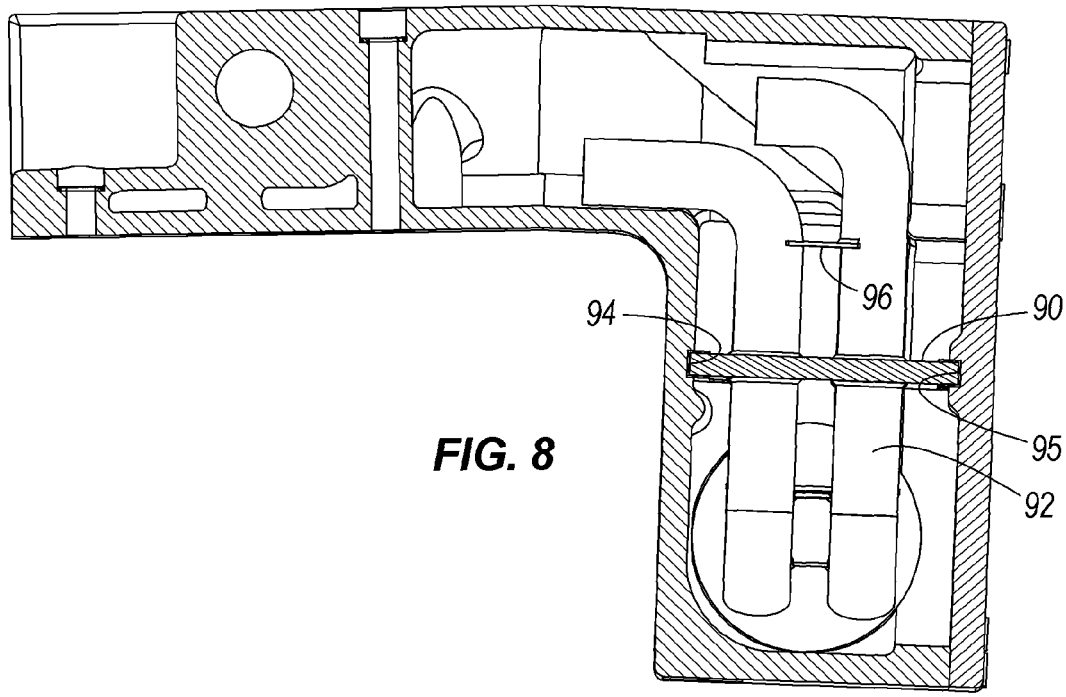
FIG. 8 is a section view taken along line 8-8 in FIG. 6.

The silencer 28 is mounted at the exhaust port 34 of the compressor 26. Of course, other constructions could employ a silencer 28 at the inlet port in place of, or in conjunction with the silencer 28. The silencer 28 includes a silencer housing 38 having an inlet port 40 for receiving compressed air from the compressor 26 and an outlet port 42 for providing dampened, compressed air to a desired conduit 44. A resonator assembly 46 is positioned inside the silencer housing 38, and the silencer housing 38 includes a removable side cover 48 enclosing the resonator assembly 46 within the silencer housing 38. The side cover 48 includes a series of holes 50 that are adapted to be aligned with corresponding threaded holes 52 in the silencer housing 38, and a series of corresponding bolts 54 and washers 56 can be used to secure the side cover 48 to the rest of the silencer housing 38 (FIG. 7). The removability of the side cover 48 facilitates access to the resonator assembly 46, which allows the resonator assembly 46 to be easily removed and replaced, as described below in more detail.

The silencer housing 38 is designed to be used with the compressor 26 illustrated in FIG. 2. The inlet port 40 of the silencer housing 38 is dimensioned to mate with the compressor exhaust port 34. Seven holes 58 on the silencer housing 38 are dimensioned to be aligned with seven corresponding threaded holes 60 on the compressor housing 30, and seven corresponding bolts 62 and washers 64 are used to secure the silencer housing 38 to the compressor housing 30 (FIGS. 2 and 7). If desired, a gasket (not shown) can be positioned between the silencer housing 38 and the compressor housing 30.

Figure 9:
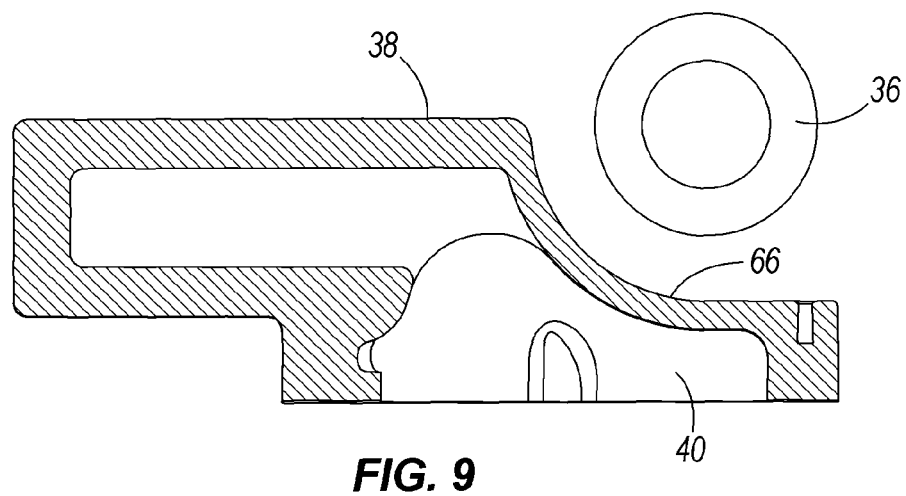
FIG. 9 is a section view taken along line 9-9 in FIG. 6.
Figure 10:
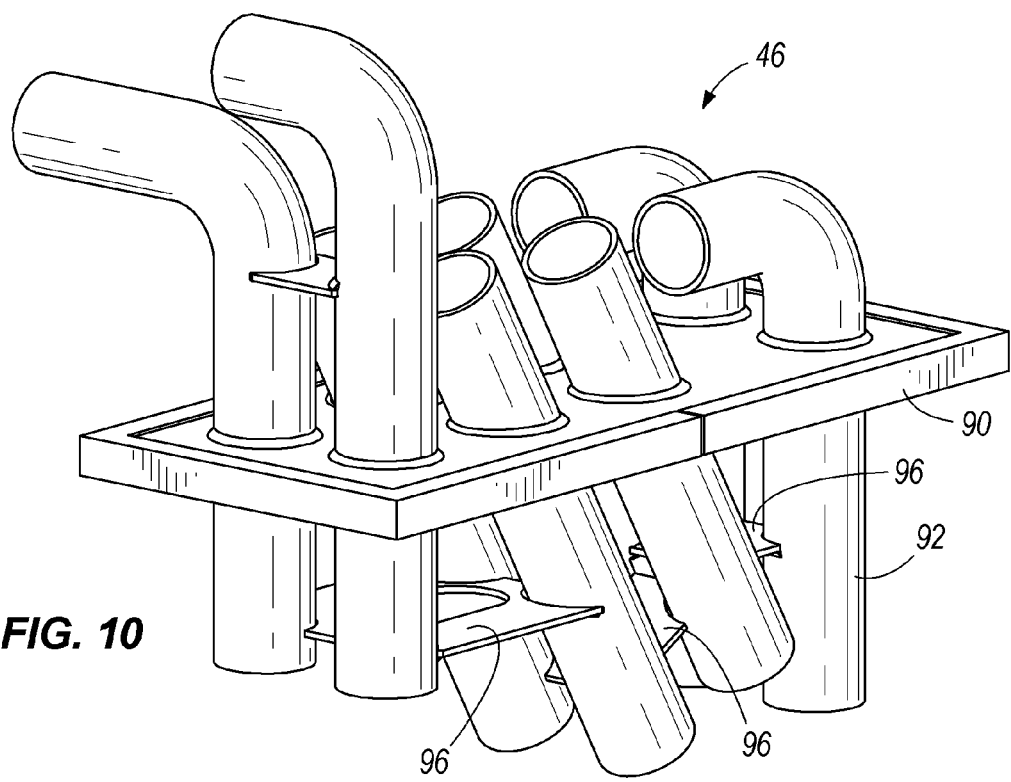
FIG. 10 is a perspective view of a resonator assembly from the discharge silencer of FIG. 7.
Figure 11:
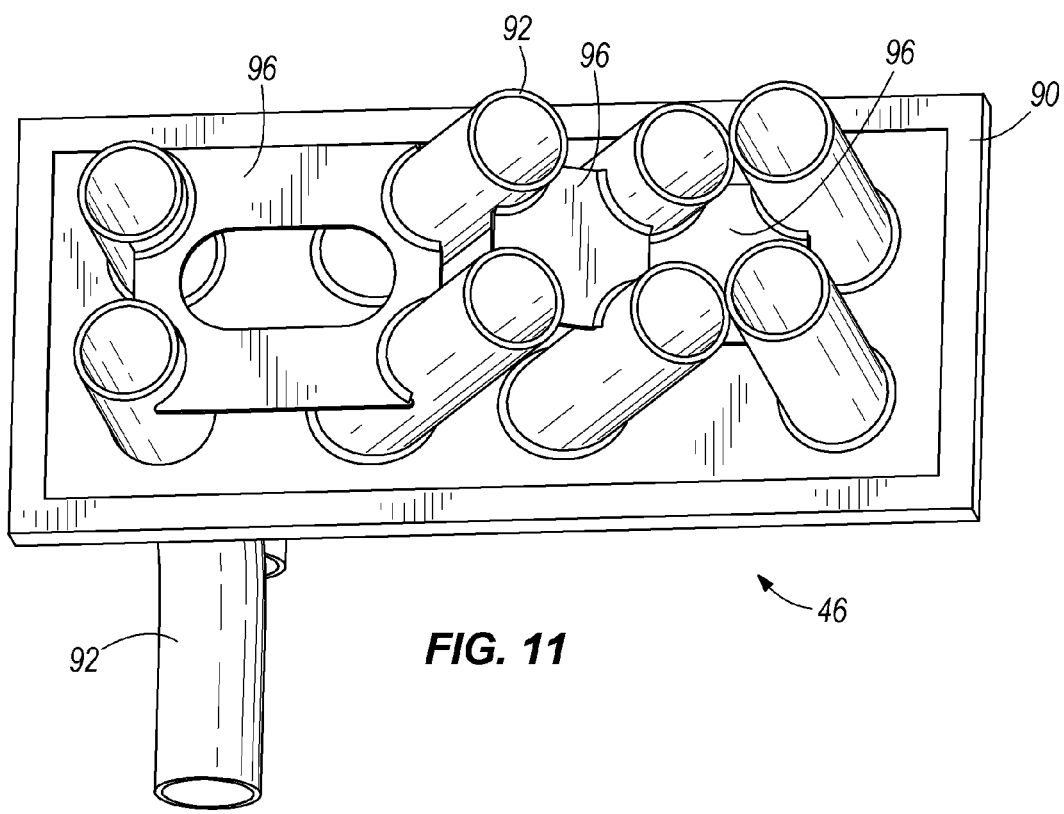
FIG. 11 is a bottom view of the resonator assembly of FIG. 10.
Figure 12:
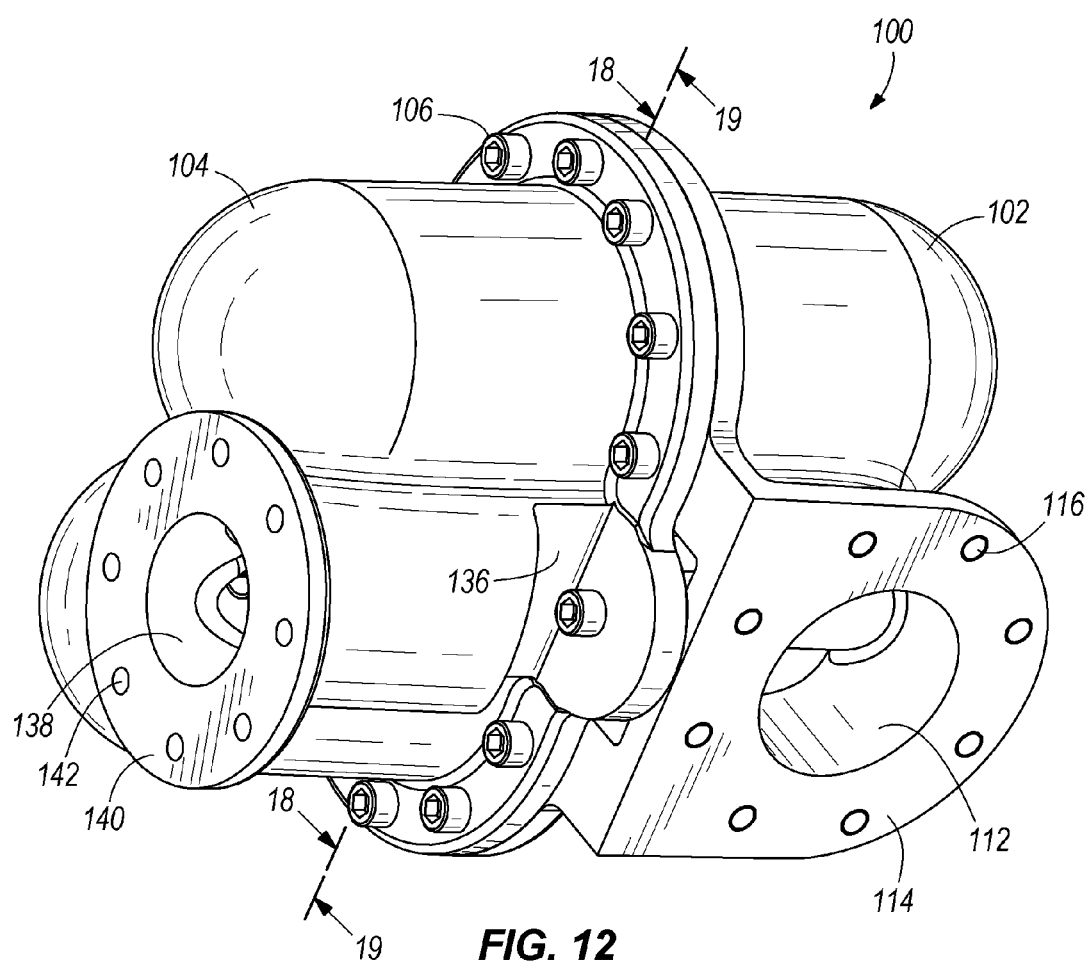
FIG. 12 is a perspective view of an alternative discharge silencer.

The silencer housing 38 includes a concave portion 66 positioned immediately above and adjacent to the silencer inlet port 40. The concave portion 66 is designed to provide clearance between the silencer housing 38 and the power input shaft 36 (and/or its associated coupling, not shown) on the compressor 26, as best shown in FIGS. 2 and 9.

Figure 4:
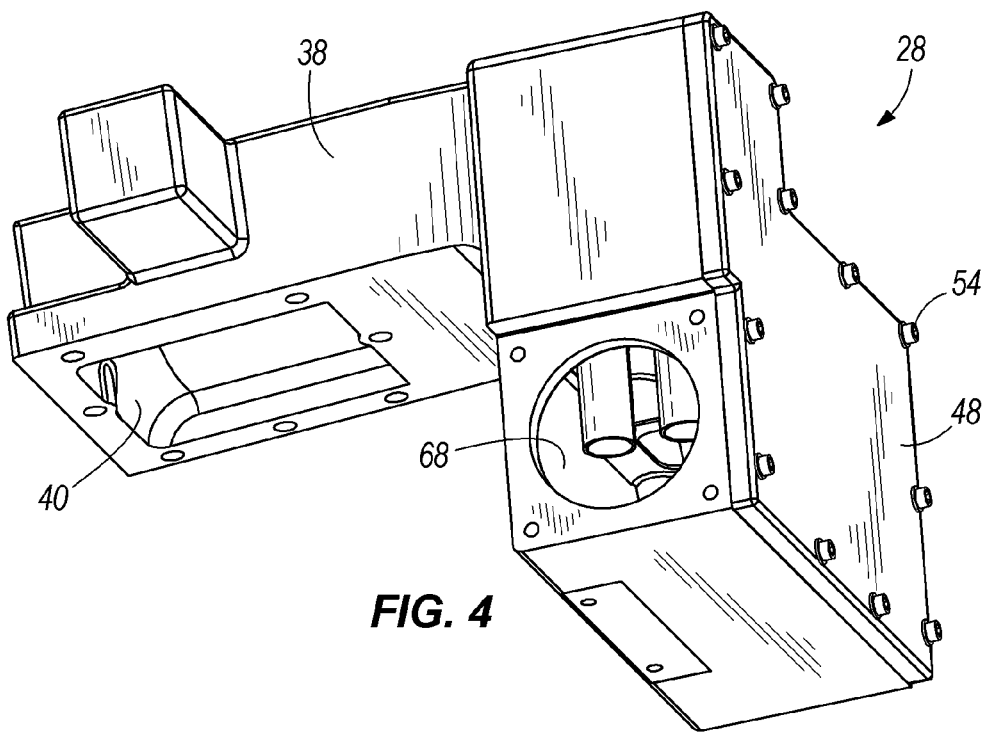
FIG. 4 is a lower perspective view of the discharge silencer of FIG. 2.
Figure 5:
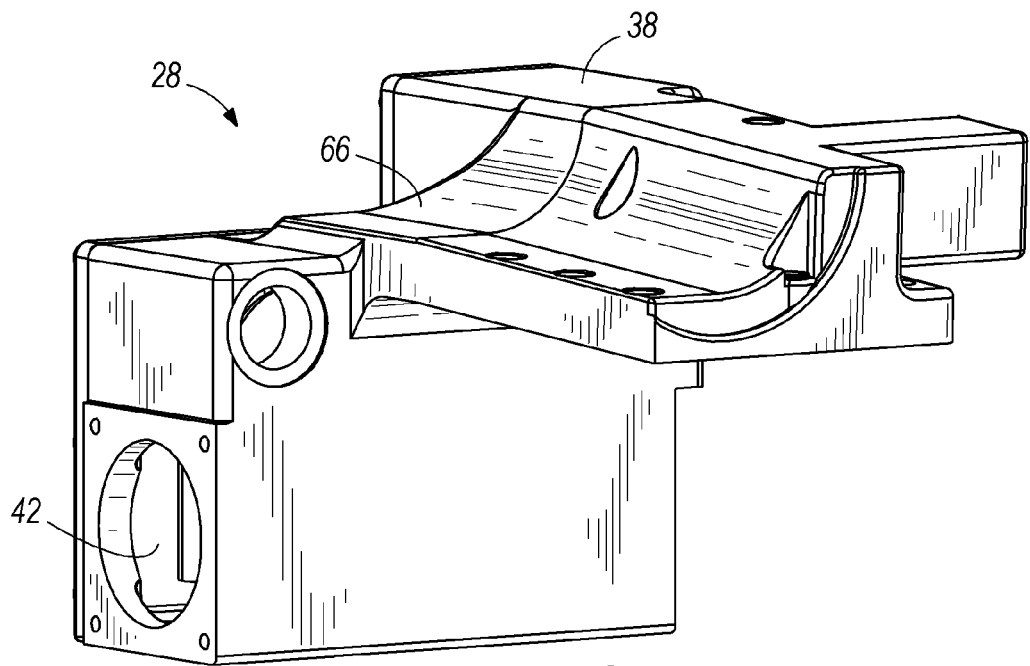
FIG. 5 is another upper perspective view of the discharge silencer of FIG. 2.
Figure 6:
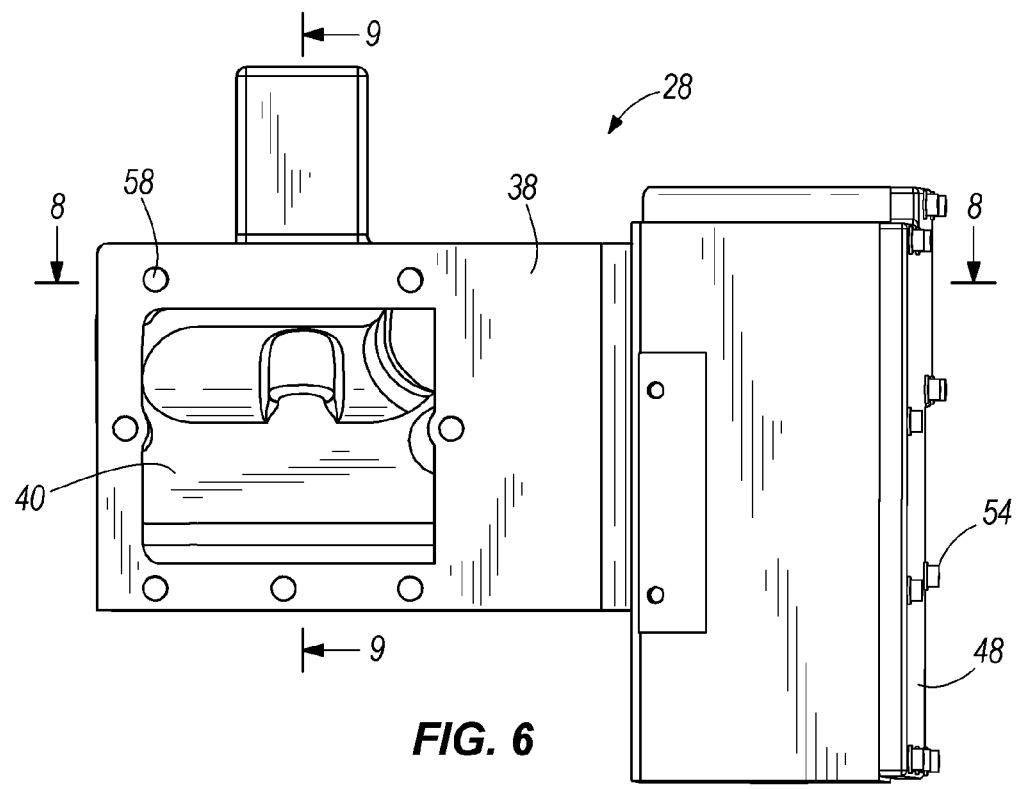
FIG. 6 is a bottom view of the discharge silencer of FIG. 2.

The silencer housing 38 further includes an access port 68 (FIGS. 4 and 7) that provides access to the inside of the silencer housing 38. When the silencer 28 is installed on the compressor 26, the access port 68 is covered by an access cover 70, and an access gasket 72 is positioned between the access cover 70 and the silencer housing 38 to provide a seal (FIG. 7). A series of bolts 74 and washers 76 secure the access cover 70 to the silencer housing 38.

An outlet valve 80, outlet gasket 82, and outlet coupling 84 are secured at the outlet port 42 by a series of bolts 86 and washers 88 (FIG. 7). The outlet valve 80 is a normally-closed, gravity-biased flapper valve that closes the outlet port 42 when the compressor 26 is not operating. The outlet coupling 84 facilitates attachment of the conduit 44 for directing pressurized air flow out of the silencer 28.

The resonator assembly 46 includes a resonator plate 90 and a series of resonator tubes 92 extending through the resonator late 90. The resonator plate 90 is removably positioned in the silencer housing 38 and can be accessed by removal of the side cover 48, as described above. Three sides of the silencer housing 38 include a recessed groove 94 that is dimensioned to receive the resonator plate 90. The side cover 48 also includes a groove 95 that is dimensioned to receive the resonator plate 90. The resonator plate 90 is designed to be slid into the groove 94, and will be maintained in that position upon securing the side cover 48 to the silencer housing 38. The interface between the resonator plate 90 and the silencer housing 38 and side cover 48 is designed to direct substantially all of the air flow through the resonator tubes 92.

In the illustrated embodiment, the resonator assembly 46 includes eight resonator tubes 92 extending through the resonator plate 90 with more or fewer tubes being suitable for use in other constructions. A series of reinforcing flanges 96 are secured between adjacent resonator tubes 92. Preferably, the resonator plate 90, resonator tubes 92, and reinforcing flanges 96 are welded at their junctures, but any suitable securing technique can be used. Alternatively, the resonator assembly 46 could be cast or molded as a single piece.

In use, the silencer 28 is secured to the compressor 26 such that the exhaust port 34 of the compressor 26 is aligned with the inlet port 40 of the silencer 28. The compressed air passes through the silencer housing 38 until it reaches the resonator assembly 46. At this point, the compressed air flow is forced to pass through the resonator tubes 92, at which time pressure pulsations in the air flow will be dampened. The dampened air flow then passes through the outlet port 42 and can be used as needed.

One aspect of the present invention is the fact that the resonator assembly 46 can be replaced in order to tune the silencer 28 to a specific compressor. In order to do this, the side cover 48 of the silencer housing 38 is removed, and the resonator assembly 46 is slid out of the silencer housing 38. A different resonator assembly (e.g., having the same sized resonator plate but different sized or oriented resonator tubes) can be slid into the silencer housing 38. The resonator tubes of the different resonator assembly are preferably sized, positioned, and oriented to be tuned to the characteristics of the compressor to which the silencer 28 is attached, thereby enhancing the dampening effects.

An alternative discharge silencer 100 is illustrated in FIGS. 12-19. The alternative silencer 100 includes an inlet housing 102 and an outlet housing 104 that are secured together by a series of bolts 106 passing through holes 108 in the outlet housing 104 and engaged into threaded holes 110 in the inlet housing 102.

The inlet housing 102 includes an inlet port 112 that is designed to be aligned with an exhaust port of a compressor. The inlet housing 102 further includes a flange 114 having a series of circumferentially-spaced holes 116 spaced around the inlet port 112. The holes 116 are positioned relative to each other such that the inlet housing 102 can be mounted to the corresponding compressor in any one of multiple rotational orientations. For example, in the illustrated embodiment, the holes 116 are equally spaced from each other, and thus the inlet housing 102 can be mounted to the corresponding compressor in any one of eight different rotational orientations.

Figure 13:
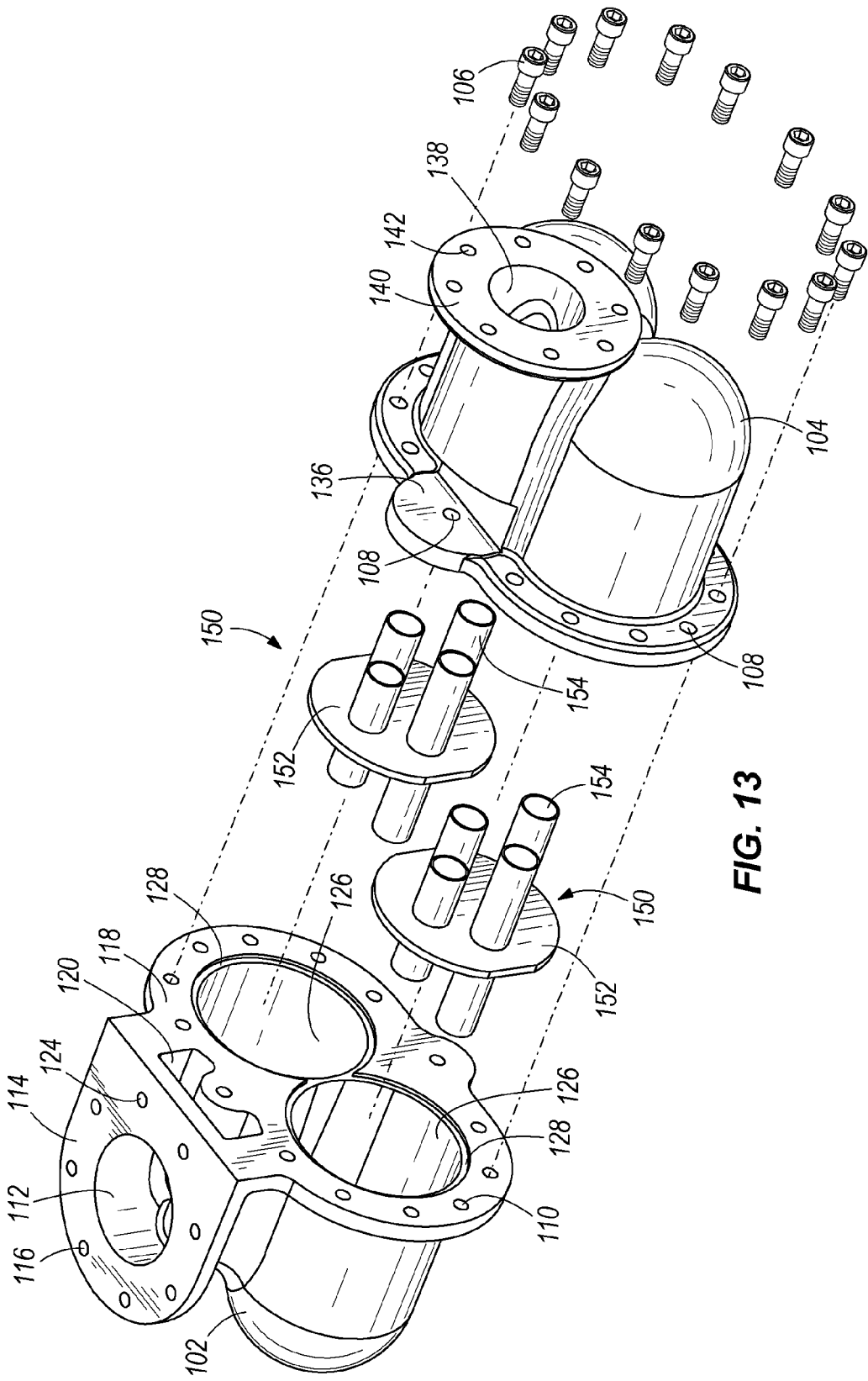
FIG. 13 is an exploded perspective view of the discharge silencer of FIG. 13.
Figure 14:
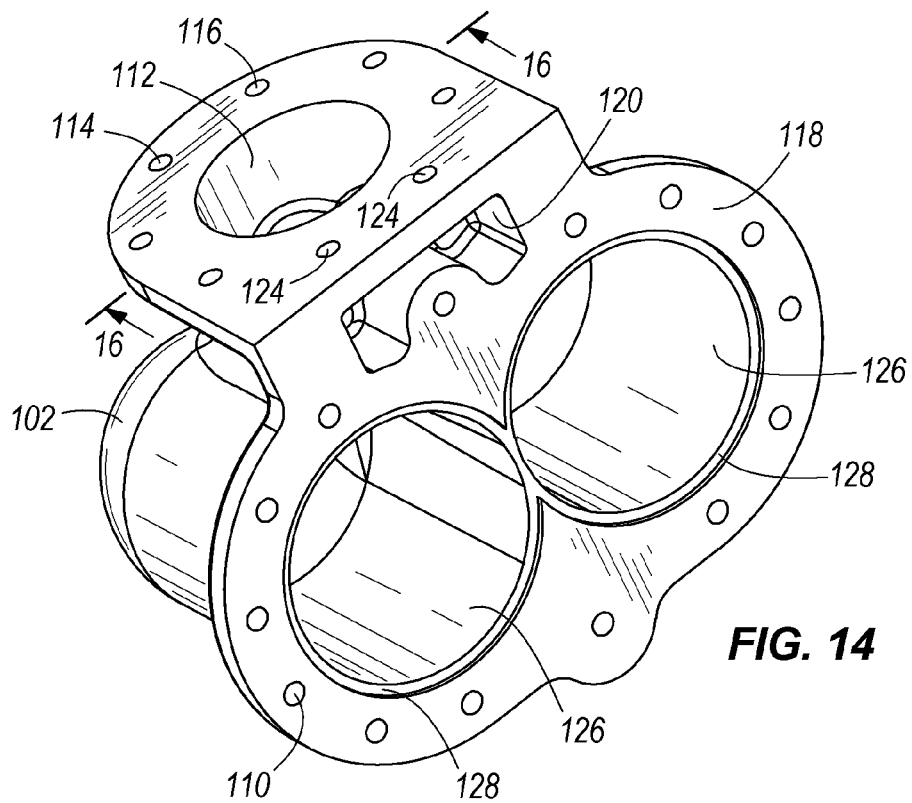
FIG. 14 is a perspective view of an inlet housing of the silencer in FIG. 12.
Figure 16:
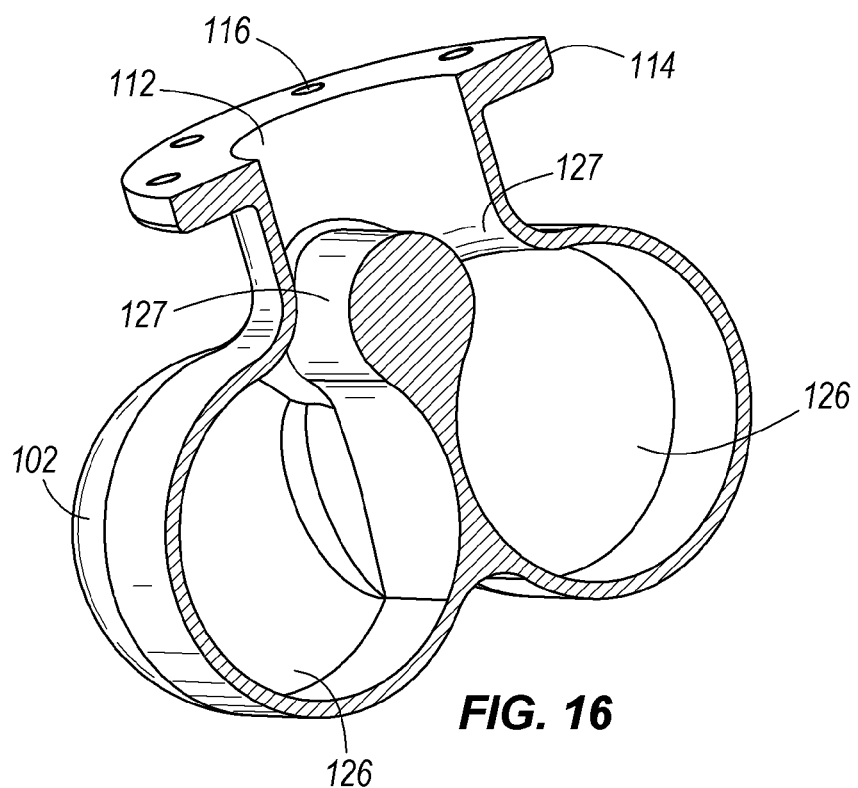
FIG. 16 is a section view taking along line 16-16 in FIG. 12.

Referring to FIGS. 13, 14 and 16, the inlet housing 102 includes an engagement face 118 that is designed to be clamped against the outlet housing 104. The illustrated engagement face 118 includes an undercut region 120 that facilitates insertion of fasteners through the two openings 124 that are aligned with the undercut region 120. The inlet housing 102 defines two substantially cylindrical inlet cavities 126 that communicate with the inlet port 112 via inlet channels 127 (FIG. 16). The engagement face 118 further includes a recessed edge 128 around each of the inlet cavities 126.

Figure 15:
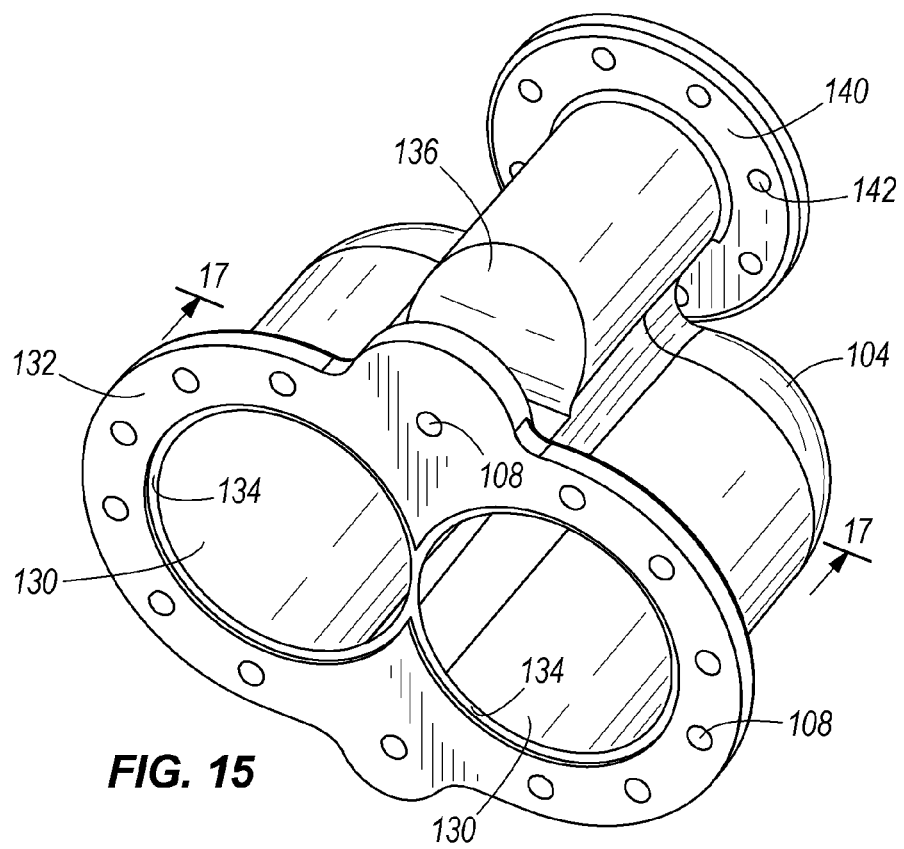
FIG. 15 is a perspective view of an outlet housing of the silencer in FIG. 12.
Figure 17:
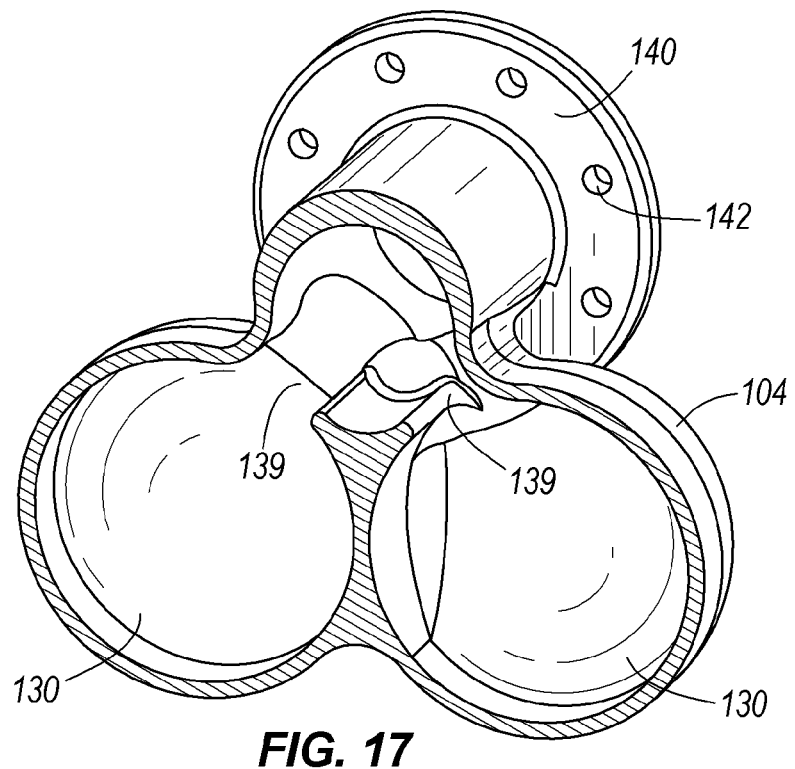
FIG. 17 is a section view taken along line 17-17 in FIG. 12.

Referring to FIGS. 13, 15 and 17, the outlet housing 104 defines two substantially cylindrical outlet cavities 130 that will be aligned with the two inlet cavities 126 when the inlet housing 102 and outlet housing 104 are secured together.

The outlet housing also includes an engagement face 132 designed to be clamped against the engagement face 118 of the inlet housing 102. Similar to the inlet housing 102, the engagement face 132 of the outlet housing 104 includes a recessed edge 134 around each of the outlet cavities 130. The outlet housing 104 further includes a back cut region 136 that facilitates access to one of the holes 108 in the outlet housing 104. The outlet housing 104 further includes an outlet port 138 that is designed to be aligned with a conduit (now shown) for providing pressurized air to a desired location. The outlet port 138 communicates with the outlet cavities 130 via outlet channels 139 (FIG. 17). An outlet flange 140 is positioned around the outlet port 138 and includes a series of circumferentially-spaced holes 142 that facilitate attachment of the outlet flange 140 to the desired conduit.

Figure 18:
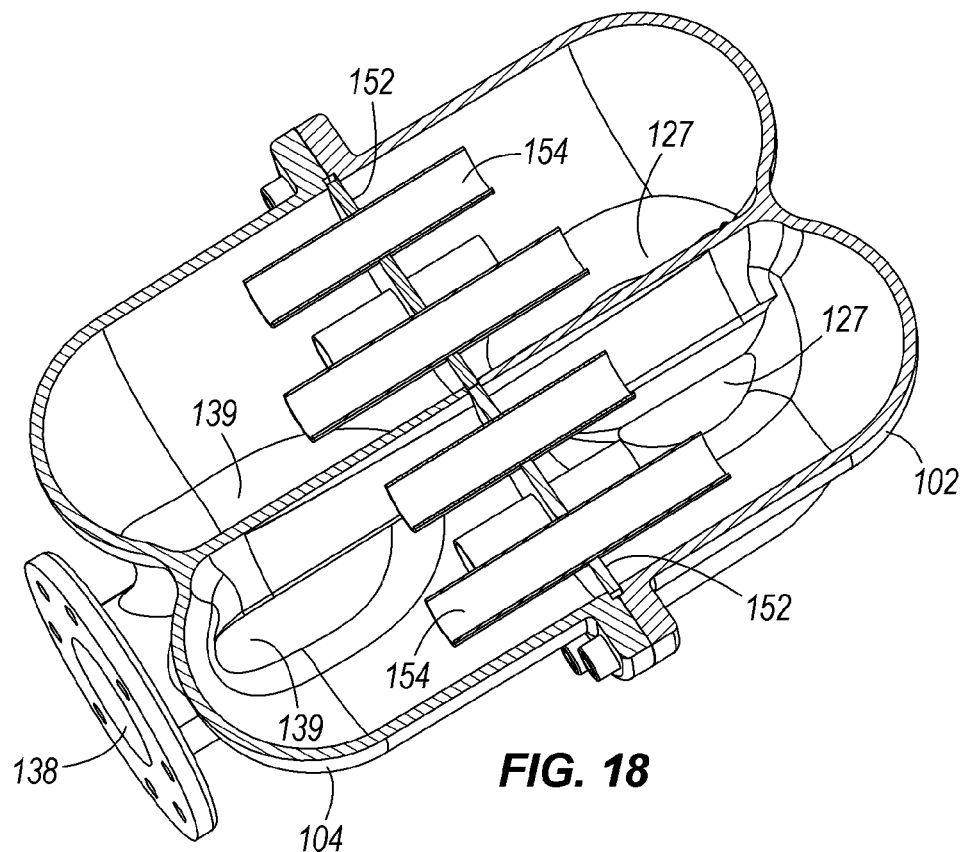
FIG. 18 is a section view taken along line 18-18 in FIG. 12.
Figure 19:
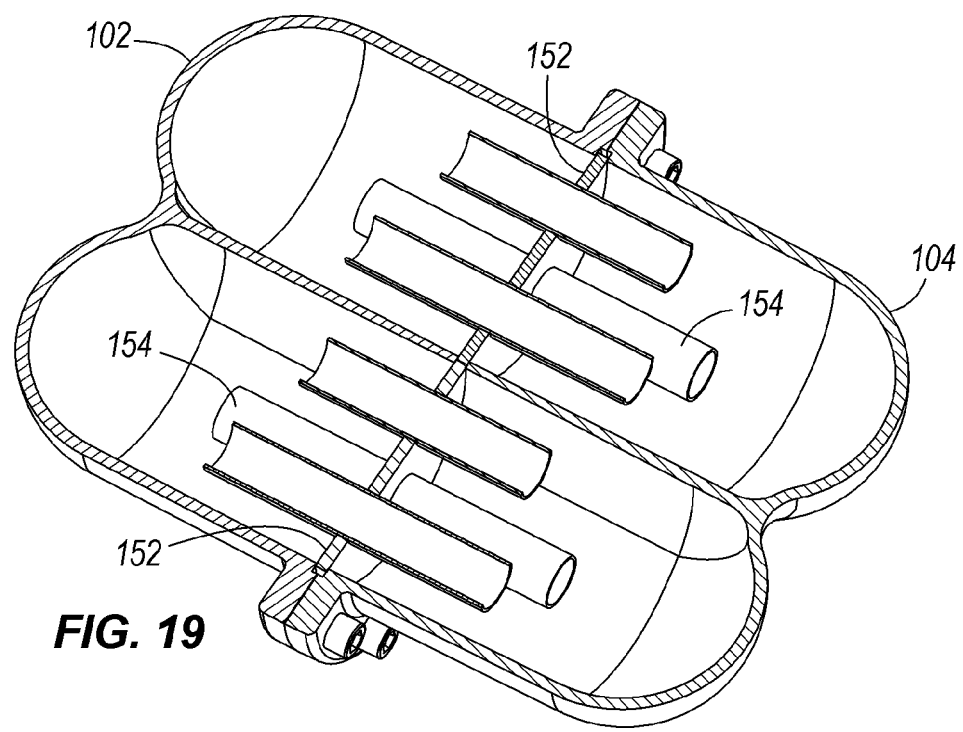
FIG. 19 is a section view taken along line 19-19 in FIG. 12.

Referring to FIGS. 13, 18 and 19, two resonator assemblies 150 are designed to fit inside the inlet housing 102 and outlet housing 104. Each resonator assembly 150 includes a resonator plate 152 designed to fit within one of the recessed edges 128, 134 in the inlet housing 102 and outlet housing 104. Each resonator assembly 150 further includes resonator pipes 154 extending through the resonator plate 152. In the illustrated embodiment, each resonator assembly 150 includes four resonator pipes 154, each having a different length. Of course any number of resonator pipes 154 could be employed if desired. In addition, the length of each pipe could be the same or could be different and is selected to tune the pipes 154 to attenuate sound at the desired frequencies. The number and length of the tubes could depend on the type of compressor or blower to which the silencer is attached and whether the silencer is positioned on the intake or discharge side of the compressor or blower.

Each resonator assembly 105 is held in place by the sandwiching effect between the recessed edges 128, 134 of the inlet housing 102 and outlet housing 104. As a result, each resonator assembly 150 can be removed from the silencer 100 by disassembling the inlet housing 102 from the outlet housing 104. Similar to the previous embodiment of FIGS. 1-11, this facilitates changing the resonator assemblies in order to tune the silencer to the characteristics of the particular compressor to which the silencer is connected.

In another construction, a middle housing is positioned between the inlet housing 102 and the outlet housing 104 to facilitate the placement of additional resonator assemblies 150. In this construction, two resonator assemblies 150 can be sandwiched between the middle housing and the inlet housing 102 and two additional resonator assemblies 150 can be positioned between the middle housing and the outlet housing 104. With the use of additional middle housings, still more resonator assemblies 150 can be employed through the use of additional middle housings if desired.

In use, the silencer 100 is secured to a compressor (not shown) such that the exhaust port of the compressor is aligned with the inlet port 112 of the silencer 100. The compressed air passes through the inlet port 112 and divides into the two inlet channels 127 before entering the inlet cavities 126. The air is then forced through the resonator tubes and into the outlet cavities 130. From the outlet cavities 130, the air passes through the outlet channels 139 and out the outlet port 138, where it can be provided to a conduit (not shown) as desired.

Various features and advantages of the invention are set forth in the following claims.

The invention claimed is:

1. A vehicle and compressor assembly comprising:
   a vehicle;
   a compressor mounted to the vehicle, the compressor having an intake port and an exhaust port; and
   a silencer having an inlet port in communication with the exhaust port of the compressor, the silencer including a silencer housing and a resonator assembly removably positioned inside the silencer housing, the silencer housing including a removable portion that facilitates access to and removal of the resonator assembly;
   wherein the compressor includes a compressor housing and a power input shaft protruding from the compressor housing adjacent the exhaust port, and wherein the silencer housing includes a concave portion that at least partially receives the power input shaft.

2. A vehicle and compressor assembly as claimed in claim 1, wherein the vehicle is a tractor.

3. A vehicle and compressor assembly as claimed in claim 1, wherein the vehicle is a trailer.

4. A vehicle and compressor assembly as claimed in claim 1, wherein the compressor is a screw compressor.

5. A vehicle and compressor assembly as claimed in claim 1, wherein the silencer housing includes an inner surface and a groove in the inner surface, and wherein the resonator assembly is at least partially positioned in the groove.

6. A vehicle and compressor assembly as claimed in claim 5, wherein the resonator assembly includes a resonator plate and a plurality of resonator pipes extending through the plate, and wherein the resonator plate is slidably positioned in the groove.

7. A vehicle and compressor assembly as claimed in claim 6, further comprising a reinforcing flange coupled between at least two of the resonator pipes.

8. A compressor and silencer assembly comprising:
   a compressor having an air intake port and an air exhaust port; and
   a silencer having an inlet port in communication with the air exhaust port of the compressor, the silencer including a silencer housing and a resonator assembly removably positioned inside the silencer housing, the silencer housing including a removable portion that facilitates access to and removal of the resonator assembly;
   wherein the compressor includes a compressor housing and a power input shaft protruding from the compressor housing adjacent the air exhaust port, and wherein the silencer housing includes a concave portion that at least partially receives the power input shaft.

9. A compressor and silencer assembly as claimed in claim 8, wherein the compressor is a screw compressor.

10. A compressor and silencer assembly as claimed in claim 8, wherein the silencer housing includes an inner surface and a groove in the inner surface, and wherein the resonator assembly is at least partially positioned in the groove.

11. A compressor and silencer assembly as claimed in claim 10, wherein the resonator assembly includes a resonator plate and a plurality of resonator pipes extending through the plate, and wherein the resonator plate is slidably positioned in the groove.

12. A compressor and silencer assembly as claimed in claim 11, further comprising a reinforcing flange coupled between at least two of the resonator pipes.

* * * * *